United States Patent [19]

Frigger et al.

[11] Patent Number: 5,066,073

[45] Date of Patent: Nov. 19, 1991

[54] BRAKE SYSTEM FOR AUTOMOTIVE VEHICLES

[75] Inventors: Heinz Frigger, Langen-Oberlinden; Klaus-Dieter Blum, Kelkheim, both of Fed. Rep. of Germany

[73] Assignee: Alfred Teves GmbH, Frankfurt, Fed. Rep. of Germany

[21] Appl. No.: 3,139

[22] Filed: Jan. 14, 1986

Related U.S. Application Data

[63] Continuation of Ser. No. 733,706, May 13, 1985, abandoned.

[30] Foreign Application Priority Data

May 15, 1984 [DE] Fed. Rep. of Germany ....... 3418044

[51] Int. Cl.$^5$ .......................... B60T 17/22; B60T 8/02
[52] U.S. Cl. ................................... 303/92
[58] Field of Search ............. 303/92, 119, 84 A; 188/181

[56] References Cited

U.S. PATENT DOCUMENTS

| | | | |
|---|---|---|---|
| 3,767,272 | 10/1973 | Leiber | 303/84 A |
| 3,874,743 | 4/1975 | Fleischer et al. | 303/92 |
| 3,899,215 | 8/1975 | Sutton . | |
| 4,361,871 | 11/1982 | Miller et al. | 303/92 |
| 4,412,290 | 10/1983 | Ambery et al. | 188/181 T |

FOREIGN PATENT DOCUMENTS

| | | |
|---|---|---|
| 2043278 | 3/1972 | Fed. Rep. of Germany . |
| 2046802 | 3/1972 | Fed. Rep. of Germany . |
| 2345860 | 3/1975 | Fed. Rep. of Germany . |
| 2539348 | 3/1976 | Fed. Rep. of Germany . |
| 2723847 | 12/1978 | Fed. Rep. of Germany . |
| 2918130 | 11/1979 | Fed. Rep. of Germany . |
| 3337800 | 5/1984 | Fed. Rep. of Germany . |
| 2305775 | 10/1976 | France . |
| 2391096 | 12/1978 | France . |
| 1020406 | 2/1966 | United Kingdom . |
| 1020406 | 2/1966 | United Kingdom . |
| 2112234 | 7/1983 | United Kingdom . |
| 2132717 | 7/1984 | United Kingdom . |

Primary Examiner—Alvin E. Oberly
Attorney, Agent, or Firm—Robert P. Seitter; J. Gordon Lewis

[57] ABSTRACT

A brake system intended for automotive vehicles provided with a brake pressure transmitter (1) which is linked to the wheel brakes through pressure medium lines, and with sensors (19 to 22, 24) which are responsive to the brake pressure or to the behavior of rotation of the wheels and by means of which the braking effect at the wheels brakes is detectable. Furthermore, separating valves ($SO_1$, $SO_2$, $SO_3$, $SO_4$, $SO_{HA}$) for shutting off the flow of pressure medium in one switching position are incorporated in the pressure medium paths leading to the wheel brakes. A monitoring circuit (3', 25') to which the sensor signals are transmittable recognizes the failure of one wheel brake and thereupon automatically commutates the separating valve located in the pressure medium path leading to the wheel brake which has failed into a valve position locking the flow of pressure medium.

3 Claims, 2 Drawing Sheets

BRAKE SYSTEM FOR AUTOMOTIVE VEHICLES

This is a continuation of application Ser. No. 733,706, filed May 13, 1985 now abandoned.

BACKGROUND OF THE INVENTION

This invention relates to a brake system for automotive vehicles having a brake pressure transmitter which is linked to the wheel brakes through pressure medium lines. Sensors are provided at the individual wheels or at wheels grouped together for the direct or indirect detection of the brake performance, that is of the braking effect or of the brake pressure. Controllable separating valves located in one or several of the pressure medium paths leading to the wheel brakes shut off the flow of pressure medium in one switching position.

It is known and customary and even legally prescribed in many countries to subdivide the pressure medium path from the brake pressure transmitter to the individual wheel brakes into two or several hydraulically separated brake circuits. This is done so that at the most only a part of the brake system fails in case of rupture of a line or in case of a leakage. In that event, the failure of the relevant brake circuit is indicated by a float or similar means through the drop of the fluid level in the fluid reservoir or in a compartment of that reservoir. Thus, the driver does not continue driving with the defective brake system and the reduced braking effect but rather to the nearest service station.

Depending on the number and location (i.e., front or rear axle) of the wheel brakes involved, dangerous situations may result due to the alteration and reduction of the braking effect caused by the defect. This is because the stopping distance becomes longer or because the driving stability may be jeopardized because of nonuniform braking effect. Although the negative effects of a leak would be reduced by hydraulically separated paths leading to each individual wheel brake, a solution to the problem is limited in practice to the realization of two or maximum three brake circuits because of the manufacturing efforts and expenditure involved. Thus, the brakes at several vehicle wheels may nevertheless fail simultaneously even in the latter case, notwithstanding such efforts and expenditure. To link each wheel or wheel brake to two brake circuits which are separated from each other hydraulically is prior art solution which, again, is highly expensive and leads to a dangerous reduction of the braking effect in the event of failure of one circuit.

It is, therefore, an object of the present invention with simple means and minor manufacturing efforts to limit the consequences of a leak in the pressure medium path, of the rupture of a line or of a defect of similar type to one wheel or to as few wheels possible.

SUMMARY OF THE INVENTION

This object is attainable by further developing and improving a brake system of the type described in that there is a monitoring circuit or a monitoring device to which the sensor signals are transmittable, by means of which the failure of one wheel brake or the failure of the pressure at the wheel brake is revealed on operation of the brakes. In the event of a fault, the system automatically switches over the separating valve in the pressure medium path leading to the wheel brake which has failed into a valve position shutting off the flow of pressure medium.

According to a particularly advantageous embodiment of the invention, the sensors are provided as electrical or electromagnetic measured value pick-up units which, for example, generate a signal whose frequency is proportional to the speed of rotation of the relevant wheel. On the other hand sensors in the form of torque measuring elements, for example foil strain gauges, may be arranged at the wheels to be monitored. The sensors, in conjunction with measuring or bridge circuits, generate electric signals proportional to the brake torque or to the brake power and transmit these signals to the monitoring circuit. Pressure sensors are suited for the direct measurement of the brake pressure in the wheel brakes. Further embodiments of the invention take into consideration the vehicle speed or an analogous reference velocity.

Only minor additional efforts as compared to prior art systems are required when according to another advantageous version of the present invention, the system is arranged as a slip-controlled brake system in which for the purpose of slip control, multiple-way valves are incorporated in the pressure medium paths leading to the wheel brakes of the controlled wheels. These valves shut off the flow of pressure medium in one switching position and function as separating valves in conjunction with the monitoring circuit or monitoring device in the event of failure of one wheel brake.

In one embodiment of such a system, wheel sensors are provided to detect the behavior of rotation of the individual wheels. The signals generated by said wheel sensors are transmittable either directly or indirectly, that is through switching circuits intended for the control of the brake slip, to the monitoring circuit and, on logic linkage of these signals, indicate the failure of one wheel brake or the failure of the pressure caused by a defect in the monitored pressure medium circuit.

According to the present invention, such a slip-controlled brake system may, in addition, comprise pressure sensors in the pressure medium paths leading to the monitored wheel brakes, the signals generated by the pressure sensors again being transmittable to the pressure monitoring circuit and/or to the switching circuits intended for the brake slip control. It is also possible according to the invention to switch in the monitoring circuit or the monitoring device by the stoplight switch of the vehicle.

Finally, it is within the scope of the present invention to put the monitoring circuit or the monitoring device out of function during the brake pressure relieving phase within a slip control operation or during the whole phase of brake slip control.

With relatively simple measures and with auxiliary means which for the most part exist in slip-controlled brake systems, a considerably higher braking effect in the event of failure of the pressure caused by a leakage in the pressure medium paths is therefore attained by the present invention. This is because in most cases the failure of the pressure can only affect and put out of operation one wheel brake. In many cases, it is possible to reduce the number of hydraulically separated brake circuits which are necessary for safety reasons and to employ, for example, a simplex master cylinder instead of a tandem master cylinder without impairing the safety. That is, without jeopardizing the conservation of a sufficient braking effect in the case of a fault.

BRIEF DESCRIPTION OF THE DRAWING

Further features, advantages and possibilities of application of the present invention are revealed by the following description of embodiments, with reference to the accompanying drawing wherein.

DETAILED DESCRIPTION

Figure 1:
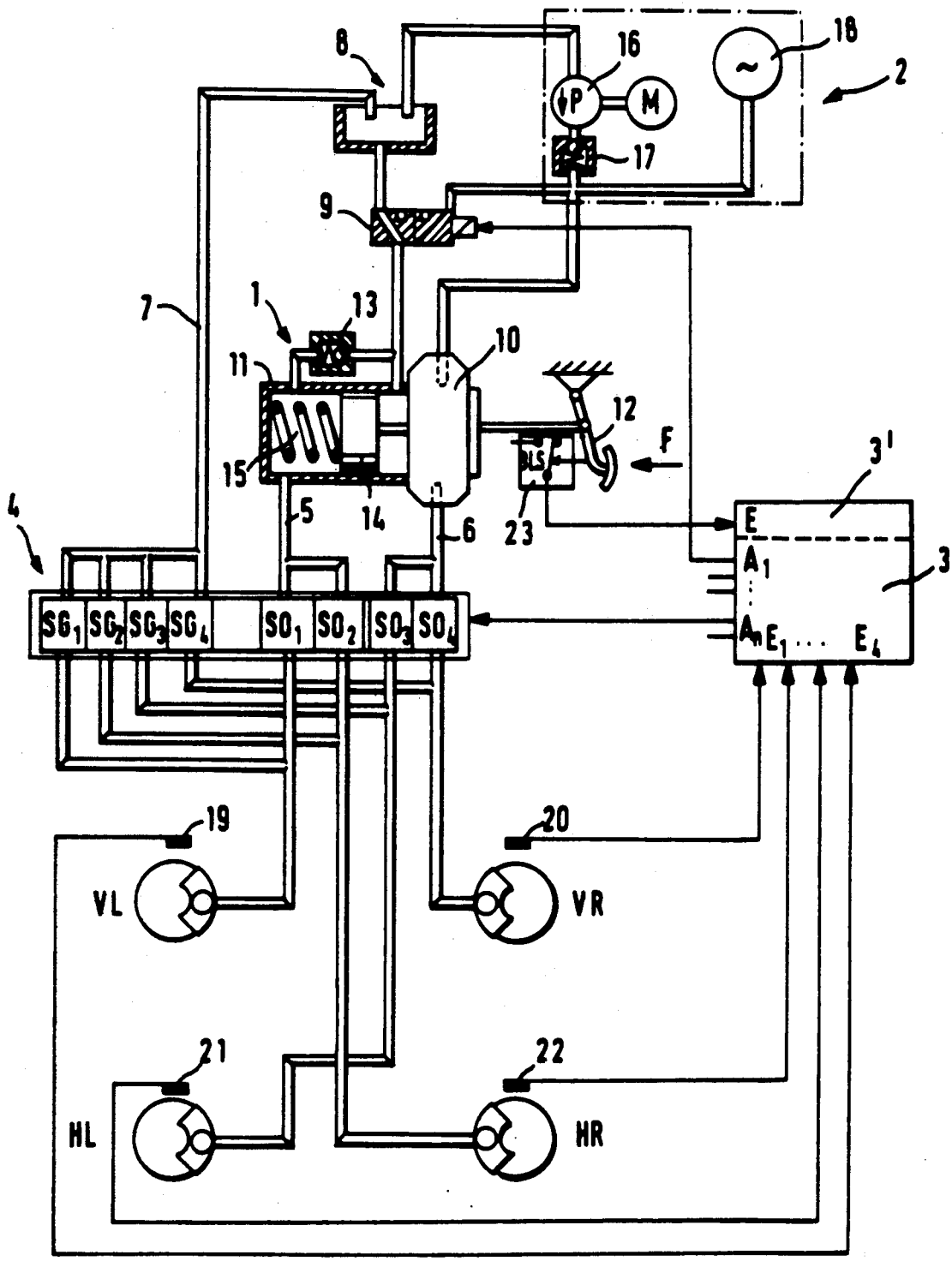
FIG. 1 is a simplified schematic representation of the hydraulic and electrical circuit diagram of a slip-controlled brake system according to the invention.

The brake system illustrated in FIG. 1 is essentially comprised of a pedal-actuated hydraulic brake pressure transmitter 1, of an auxiliary energy supply system 2, of an electronic controller 3, and of a valve block 4 through which the two brake circuits 5 and 6 are connected diagonally to the wheel brakes of the front and rear wheels, that is front left VL, front right VR, rear right HR and rear left HL, on one hand, and through which a recycling of pressure medium from the wheel brakes, that is to say, from the wheel brake cylinders of the individual wheels by way of a reflux line 7 to a fluid reservoir 8 allows, in addition, to be opened up or switched in. Beyond this, a 3/2-way valve 9, a so-called main valve, is provided through which, in the event of a controlling action, pressure medium allows to be fed to the brake pressure transmitter 1 either directly from the auxiliary pressure source 2, as illustrated, or, alternatively, from a dynamic circuit.

The brake pressure transmitter 1 is composed of a hydraulic brake power booster 10 and a simplex master cylinder 11. On operation of the brake system by a foot effort exerted on the pedal 12 and symbolized by the arrow F, a brake pressure which is proportional to the foot effort and is boosted with the aid of the pressure of the auxiliary energy source 2 is generated in both hydraulic brake circuits 5, 6. In the context under review, the brake circuit 6 is configurated as a dynamic brake circuit and the circuit 5 as a static one into which pressure medium is, however, controlledly fed, during the brake slip control, from the auxiliary energy source 2 through the multiple-way valve 9 and a cup-shaped seal 13 at the circumference of the master cylinder piston 14 or through a non-return valve 13 incorporated in the cup, in order to maintain a certain minimum volume within the power chamber 15 of the master cylinder 11 in any condition, that is also in the event of an efflux of pressure medium from the static circuit 5 to the fluid reservoir 8.

An "SO" valve (meaning a valve, open in the de-energized state). $SO_1$ to $SO_4$, which is switched to free passage in the position of rest is incorporated in the pressure medium path from the brake pressure transmitter 1 to the brakes of each one of the wheels. These valves may, for example, be constituted by electromagnetically actuatable 2/2-way valves which are commutatable into "locking" position by an electric signal or, in other words, by energization of the electric switching magnet, preventing in this way a further increase of the brake pressure in the wheel brakes.

In the pressure medium path from each of the wheel brakes to the reflux line 7, there is incorporated a further 2/2-way valve, $SG_1$ to $SG_4$ which valves, however, as denoted by the symbol "SG" meaning a valve, closed when de-energized, interrupt the reflux as long as they are not commutated.

With the aid of these valves, open when de-energized and valves, closed when de-energized, any further pressure rise allows to be prevented in the known manner as a countermeasure in the imminence of locking of a wheel, or even a reduction of the pressure down to the pressure level of the fluid reservoir 8 be attained.

The auxiliary energy source 2 is furnished with a pressure medium pump 16, driven by an electric motor, with the pertaining non-return valve 17 and furnished with hydraulic accumulator 18.

The multiple-way valves $SO_1$ to $SO_4$ and $SG_1$ to $SG_4$ as well as the main valve 9 are controlled by the electronic controller 3 in which information on the behavior of rotation of the wheels is input with the aid of the wheel sensors 19 to 22. The signalling lines which connect the controller 3 to the sensors and to the valves and which are partly made up of multi-conductor or bundle conductor cables, are outlined by dashed lines in FIG. 1. The controller contains hardwired or programmable electronic switching circuits, for example in the shape of microcomputers, for the purpose of processing and logic linkage of the signals. The signal inputs $E_1$ to $E_4$, the outputs $A_1$ to $A_n$ and the signalling devices (direction of the arrows), too, are illustrated symbolically.

In the embodiment of the invention illustrated in FIG. 1, the electronic controller 3 moreover contained a monitoring circuit 3' which is configurated in this context as forming part of the electronic logic component of the controller. The signals of the sensors 19 to 22 are transmitted directly or indirectly to the monitoring circuit 3'. In addition to these, the operation of the brakes is signalled to the monitoring circuit 3' with the aid of a switch 23, for example with the aid of the stop-light switch BLS existing in any case. The failure of one wheel brake, that is to say, the missing of any braking effect whatsoever at one wheel allows to be revealed very rapidly by the behavior of rotation of the individual wheels when comparing it to the behavior of rotation of the rest of the wheels, maybe taking into consideration the brake pressure and/or other measured parameters, whereupon a potential further loss of pressure medium is prevented by locking of the "SO" valve or valves, open when de-energized which are arranged at the wheel brakes involved, so safeguarding the functioning of the sound wheel brakes, also that of the second wheel brake linked to the brake circuit 5 or 6.

If in a two-circuit brake system of the kind illustrated in FIG. 1, the defect or loss of pressure medium should immediately cause the complete failure of the second wheel brake, too, linked to the same circuit, then the defective wheel brake, that is the leaking pressure medium path, allows to be detected by commutating the "SO" valves, that is the valves, open when de-energized, and separating the two wheel brakes hydraulically, by subsequently switching the "SO" valves, open when de-energized alternately back into the position of rest for a short while and by monitoring the reaction of the brakes. Thereupon, exclusively the "SO" valve, open when de-energized which is located in the leaking pressure medium path is being energized until the braking operation has ended or, alternatively, until the valve has been reset manually or until the fault has been eliminated.

By means of restriction points in the connecting path of wheel brakes linked in parallel to one brake circuit, by means of non-return valves in combination with specific provisions to let down the brake pressure when the brake is being released and by other means, the reaction an untight brake line may have on the parallel brake allows to be cancelled or delayed if needs be, so that the monitoring circuit is given the opportunity to recognize the leaking path and to energize the relevant separating valve.

In the embodiment of the invention described in the foregoing, the "SO" valves $SO_1$ to $SO_4$, that is the valves, open when de-energized, serve for the slip control and act simultaneously as separating valves which in the event of failure of one wheel brake, shut off the involved pressure medium path in conjunction with the monitoring circuit 3'. Also the sensors 19 to 22 serving to detect the behavior of rotation of the wheels are required anyway for the slip control, as a result whereof the inventive improvement of the brake system on the whole does not but involve minimum additional efforts. As compared with the conventional slip-controlled brake system, only an additional monitoring circuit 3', that is to say, a relevant extension of the logic of the electronic controller 3 is required.

The valve block 4, at least the valves $SO_1$ to $SO_4$, open when de-energized which are comprised in that valve block, are expediently positioned directly adjacent to the brake pressure transmitter 1 or even conceived to form one constructional unit jointly with the brake pressure transmitter. In this manner, locking one of the valves $SO_1$ to $SO_4$, the whole hydraulic line connecting the valve block 4 with the wheel brakes, and the wheel brake itself are monitored and it is safeguarded that a defect or untightness exclusively involves the wheel brake which is directly connected.

When fitting the monitoring circuit, which constitutes as essential element of the subject matter of the present invention, into a slip-controlled brake system it is expedient in many cases to put the monitoring circuit out of function at the moment when the brake slip control starts or, as an alternative, only during certain phases of the brake slip control action, especially so during the phase of pressure relieving, in order to avoid that the pressure relieving phase might erroneously be interpreted by the monitoring circuit 3' as a failure of a wheel brake. A response of the monitoring circuit occasioned by brake slip control actions does, however, allow to be safely prevented also in other ways, as, say, by limiting the monitoring function to certain braking phases, for example to the beginning of the braking action, by taking into consideration additional time criteria, etc.

Figure 2:
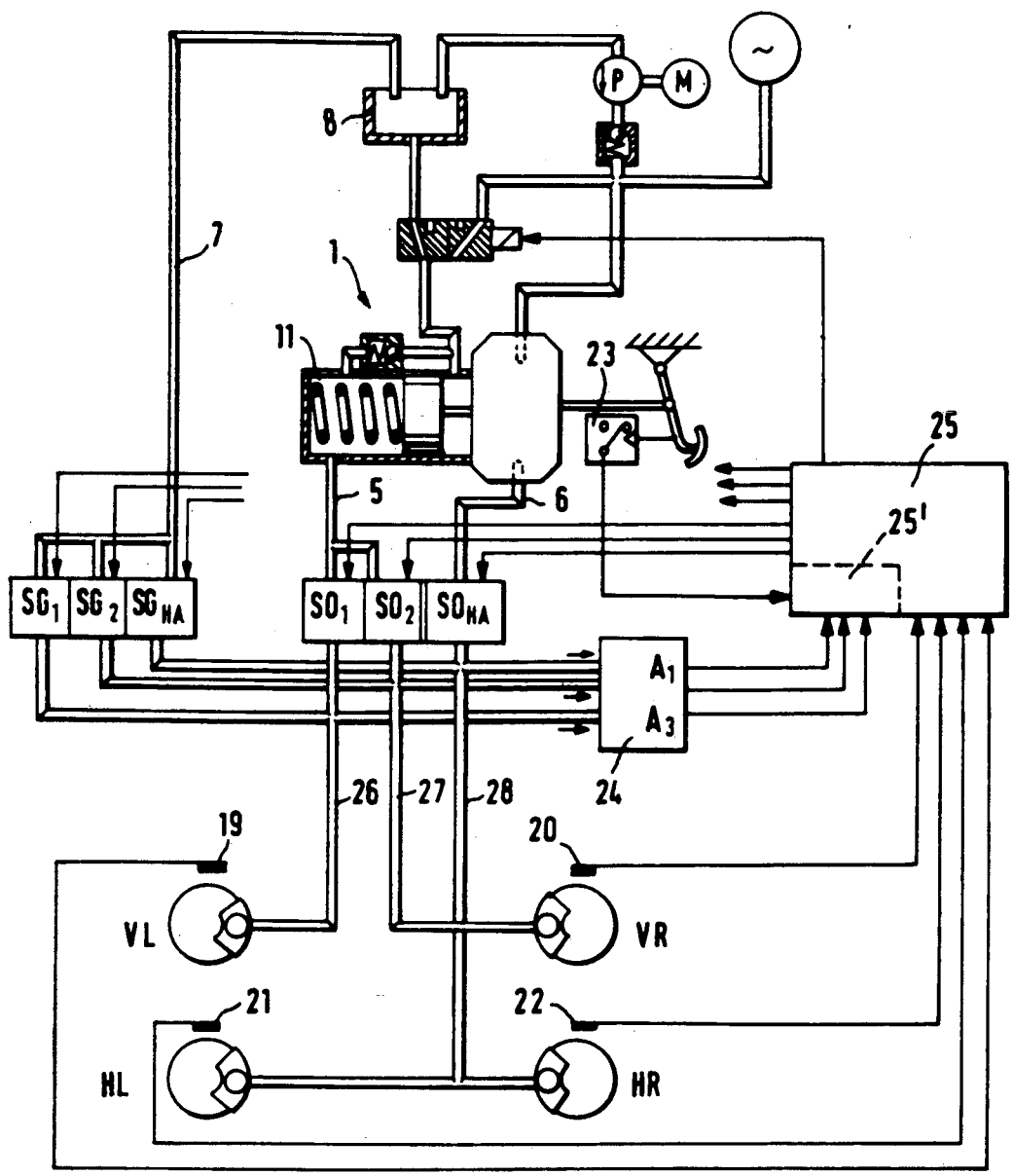
FIG. 2 shows a further embodiment of the invention in a type of representation identical to that of FIG. 1.

The embodiment of the invention illustrated in FIG. 2 is distinguished from the brake system described so far primarily by the use of pressure sensors, that is of a pressure monitor 24, which in combination with the logic element of the controller 25 or, rather, with a part of the controller logic 25' constitutes the monitoring device of the brake system according to the present invention.

A further variant with respect to the embodiment according to FIG. 1 consists in the modified subdivision of the brake circuits. Whereas a diagonal subdivision was chosen in the version according to FIG. 1, both rear wheels HR, HL, that means rear right, rear left, are linked to the dynamic brake circuit, that is to say, to the booster circuit 6 through a common control valve $SO_{HA}$. The master cylinder 11 is connected to the front wheels VL, VR, that means front left, front right, through two independently controllable valves $SO_1$ and $SO_2$, open in the de-energized state. The valves, closed when de-energized, $SG_1$, $SG_2$, $SG_{HA}$, located in the path leading to the reflux line 7, that is to the fluid reservoir 8, are subdivided in an analogous manner. As is well known, the common control of the brake pressure at the rear axle which renders it possible to save on valves with respect to the individual control of all wheels does not affect the braking behavior of the vehicle but at a relatively slight extent.

In the version according to FIG. 2, the failure of one wheel brake or a leakage in one of the pressure medium lines 26, 27, 28 is recognized directly by the pressure sensors in the pressure monitor 24 which generates a relevant electric signal through the signalling lines which are outlined in dashed lines in the diagram and which link the outputs $A_1$ to $A_3$ of the pressure monitor 24 with the controller 25, 25' and which upon logic linkage of these signals with the signal of the stoplight switch 23 and maybe with brake slip control signals, causes the commutation of the valve, open when de-energized, $SO_1$, $SO_2$ or $SO_{HA}$, which leads to the defective brake circuit. Also in this embodiment, if, for example, the line 26 as well as the line 27 remain pressureless, it is possible initially to lock both valves $SO_1$ and $SO_2$ and subsequently to find out in which circuit the fault has occurred by briefly unlocking the valve $SO_1$ or $SO_2$. Afterward, exclusively the separating valve in the defective circuit is locked.

The sensors 19 to 22 are exclusively required for the slip control in the system according to FIG. 2, but it is also possible as well to evaluate both the pressure monitor 24 and the signals of the wheel sensors 19 to 22 for the monitoring, that is for the recognition of a leaking hydraulic circuit, even more so because this involves but slight additional efforts, if any, if controllers with electronic signal processing and signal linkage are employed.

As an alternative, foil strain gauges may be applied to the wheel suspension in lieu of the wheel sensors or of the pressure sensors. Also from the signals of these sensors, an inference allows to be drawn on the failure of one individual wheel brake and the pressure medium circuit involved then be shut off with the aid of the monitoring circuit.

What is claimed is:

1. A brake system for automotive vehicles, said system comprising a brake pressure transmitter linked to wheel brakes through pressure medium lines, sensor means for detecting the braking effect at wheels to which the brakes are respectively attached, separating valve means for shutting off the flow of pressure medium in one switching position and located in at least one of the pressure medium paths leading to the wheel brakes, monitoring means responsive to the sensor signals for detecting failure of one wheel brake upon operation of the brakes, said monitoring means automatically switching over the separating valve means in the path leading to the failed wheel brake into a closed valve position, shutting off its flow of pressure medium, said sensor means being configured in the shape of electrical or electro-magnetic measured value pick-up units positioned at the individual wheels and generating an electric signal corresponding to the rotational behavior of the relevant wheel for input to an electronic linkage switching circuit.

2. A brake system as claimed in claim 1, wherein said measured value pick-up units generate signals whose frequency is proportional to the speed of rotation of the wheel adjacent the corresponding pick-up unit.

3. A brake system for automotive vehicles, said system comprising a brake pressure transmitter linked to wheel brakes through pressure medium lines, sensor means for detecting the braking effect at wheels to which the brakes are respectively attached, separating valve means for shutting off the flow of pressure medium in one switching position and located in at least one of the pressure medium paths leading to the wheel brakes, monitoring means responsive to the sensor signals for detecting failure of one wheel brake upon operation of the brakes, said monitoring means automatically switching over the separating valve means in the path leading to the failed wheel brake into a closed valve position, shutting off its flow of pressure medium, said sensor means including torque measuring elements located at the wheels and, said sensor means, in conjunctio with measuring or bridge circuits, generating electric signals proportional to the brake torque or to the brake power at the wheel at which they are located.

* * * * *